(12) United States Patent
Kwon

(10) Patent No.: US 11,760,208 B2
(45) Date of Patent: Sep. 19, 2023

(54) METHOD AND SYSTEM FOR CONTROLLING HIGH VOLTAGE POWER OF ELECTRIC VEHICLE

(71) Applicants: HYUNDAI MOTOR COMPANY, Seoul (KR); KIA CORPORATION, Seoul (KR)

(72) Inventor: Mun Soon Kwon, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 202 days.

(21) Appl. No.: 17/375,346

(22) Filed: Jul. 14, 2021

(65) Prior Publication Data

US 2022/0063419 A1 Mar. 3, 2022

(30) Foreign Application Priority Data

Aug. 26, 2020 (KR) .......................... 10-2020-0108023

(51) Int. Cl.
*B60L 15/20* (2006.01)
*G08G 1/01* (2006.01)

(52) U.S. Cl.
CPC ............ *B60L 15/20* (2013.01); *G08G 1/0133* (2013.01); *G08G 1/0145* (2013.01); *B60L 2240/68* (2013.01)

(58) Field of Classification Search
CPC .... G08G 1/0145; G08G 1/0133; B60L 15/20; B60L 2240/68
See application file for complete search history.

(56) References Cited

U.S. PATENT DOCUMENTS

| 6,247,437 | B1 * | 6/2001 | Yamaguchi | ......... F02N 11/0848 |
| | | | | 903/905 |
| 8,860,377 | B2 * | 10/2014 | Scheucher | ............ H02J 7/0045 |
| | | | | 320/162 |
| 10,377,389 | B2 * | 8/2019 | Bryan | ................. B60H 1/00764 |
| 10,525,846 | B2 * | 1/2020 | Watanabe | ................. B60L 1/08 |
| 10,882,399 | B2 * | 1/2021 | Koebler | .................... B60L 50/62 |
| 11,059,385 | B2 * | 7/2021 | Moriya | ............. H01M 8/04037 |

(Continued)

FOREIGN PATENT DOCUMENTS

KR 10-2139572 B1 7/2020

*Primary Examiner* — Luis A Martinez Borrero
(74) *Attorney, Agent, or Firm* — Morgan, Lewis & Bockius LLP

(57) ABSTRACT

A method and system for controlling high voltage power of an electric vehicle to efficiently control outputs of power control object parts by controlling low-level controllers provided in the power control object parts through a high-level controller having various types of vehicle information, may include a power state monitoring step in which a high-level controller detects power variations in power control object parts through low-level controllers provided in the power control object parts, a power state determination step in which the high-level controller determines a stable power supply state and an unstable power supply state for the power control object parts on the basis of a preset power reference value, and a load output control step in which the high-level controller controls all load outputs for the power control object parts according to the stable power supply state and the unstable power supply state.

18 Claims, 14 Drawing Sheets

(56) References Cited

U.S. PATENT DOCUMENTS

| | | | | |
|---|---|---|---|---|
| 11,180,025 B2* | 11/2021 | Koebler | | G01C 21/3469 |
| 11,186,173 B2* | 11/2021 | Koebler | | B60L 3/12 |
| 11,214,144 B2* | 1/2022 | Koebler | | B60L 8/003 |
| 11,230,190 B2* | 1/2022 | Koebler | | B60W 10/11 |
| 11,247,564 B2* | 2/2022 | Koebler | | G08G 1/0112 |
| 11,254,211 B2* | 2/2022 | Koebler | | G06F 7/00 |
| 11,267,338 B2* | 3/2022 | Koebler | | F16D 61/00 |
| 11,279,233 B2* | 3/2022 | Koebler | | B60T 1/10 |
| 11,345,236 B2* | 5/2022 | Koebler | | B60W 20/12 |
| 11,370,302 B2* | 6/2022 | Koebler | | B60L 15/2045 |
| 11,390,165 B2* | 7/2022 | Koebler | | G08G 1/096844 |
| 2002/0007975 A1* | 1/2002 | Naito | | B60W 10/18 |
| | | | | 903/917 |
| 2004/0090195 A1* | 5/2004 | Motsenbocker | | B60L 58/25 |
| | | | | 318/109 |
| 2011/0064981 A1* | 3/2011 | Scheucher | | B60L 15/20 |
| | | | | 429/99 |
| 2011/0087395 A1* | 4/2011 | Yamamoto | | B60W 10/26 |
| | | | | 701/22 |
| 2012/0191279 A1* | 7/2012 | Wippler | | H02J 7/0047 |
| | | | | 701/22 |
| 2013/0049364 A1* | 2/2013 | Teets | | H04W 64/00 |
| | | | | 290/45 |
| 2014/0370333 A1* | 12/2014 | Kwon | | H01M 10/625 |
| | | | | 429/50 |
| 2015/0369872 A1* | 12/2015 | Meyer | | B60L 58/13 |
| | | | | 702/63 |
| 2016/0052423 A1* | 2/2016 | Zhou | | B60L 15/06 |
| | | | | 701/22 |
| 2016/0137069 A1* | 5/2016 | Ishigaki | | B60L 50/40 |
| | | | | 307/43 |
| 2016/0207414 A1* | 7/2016 | Watanabe | | B60L 15/20 |
| 2016/0355103 A1* | 12/2016 | Lai | | H02P 23/0022 |
| 2017/0018823 A1* | 1/2017 | Kwon | | H01M 10/613 |
| 2018/0111486 A1* | 4/2018 | Kwon | | B60K 11/00 |
| 2018/0111497 A1* | 4/2018 | Li | | B60L 7/10 |
| 2018/0112586 A1* | 4/2018 | Kwon | | F01P 11/16 |
| 2018/0201150 A1* | 7/2018 | Kubo | | B60L 58/25 |
| 2018/0257666 A1* | 9/2018 | Bryan | | B60L 15/2045 |
| 2019/0283589 A1* | 9/2019 | Koebler | | G08G 1/0112 |
| 2019/0283600 A1* | 9/2019 | Koebler | | G01C 21/3617 |
| 2019/0291590 A1* | 9/2019 | Yeung | | B60L 50/51 |
| 2020/0070679 A1* | 3/2020 | Wang | | B60L 58/21 |
| 2020/0106114 A1* | 4/2020 | Moriya | | H01M 10/625 |
| 2020/0331451 A1* | 10/2020 | Money | | B60L 15/2045 |
| 2021/0138957 A1* | 5/2021 | Peng | | B60L 15/2045 |
| 2021/0237588 A1* | 8/2021 | Jablon | | B60L 15/007 |
| 2021/0339650 A1* | 11/2021 | Hashimoto | | B60L 58/12 |
| 2022/0032781 A1* | 2/2022 | Veltman | | B60L 15/2009 |
| 2022/0063419 A1* | 3/2022 | Kwon | | B60L 1/02 |
| 2022/0073104 A1* | 3/2022 | Lee | | G08G 1/04 |
| 2022/0185114 A1* | 6/2022 | Bebeti | | B60L 50/70 |
| 2022/0410654 A1* | 12/2022 | Kwon | | B60L 58/20 |
| 2023/0132873 A1* | 5/2023 | Kwon | | H02J 7/0047 |
| | | | | 307/9.1 |

* cited by examiner

FIG. 7

| Classification | Zone A | | Zone B | | Zone C | | Note |
|---|---|---|---|---|---|---|---|
| | ATC | BMS | ATC | BMS | ATC | BMS | |
| Required output of power control object part | 70% | 90% | 40% | 80% | 70% | 30% | PWM DUTY |
| Final output of power control object part (conventional system) | 90 | | 80 | | 70 | | MAX output control |
| Final output of power control object part (system of invention) | 90 (Maximum value output) | | 60 (Intermediate value output) | | 30 (Minimum value output) | | Control by zone |

METHOD AND SYSTEM FOR CONTROLLING HIGH VOLTAGE POWER OF ELECTRIC VEHICLE

CROSS-REFERENCE TO RELATED APPLICATION

The present application claims priority to Korean Patent Application No. 10-2020-0108023, filed on Aug. 26, 2020, the entire contents of which is incorporated herein for all purposes by this reference.

BACKGROUND OF THE INVENTION

Field of the Invention

The present invention relates to a method and system for controlling high voltage power of an electric vehicle, and particularly, to a method and system for controlling high voltage power of an electric vehicle, which are configured to efficiently control outputs of power control object parts of an electric vehicle by controlling low-level controllers provided in the power control object parts through a high-level controller having various types of vehicle information.

Description of Related Art

Various electrical parts (power control object parts) are used in electric vehicles (including hydrogen powered electric vehicles) using a high-voltage battery. For example, various electrical parts such as electric vehicle parts, chassis parts, body parts, and other parts are used in electric vehicles. Electric vehicle parts include a high-voltage battery, a battery heater, an inverter, an on-board charger (OBC), a low-voltage DC converter (LDC), etc., chassis parts include an electric compressor, a cooling fan, a coolant heater, etc., body parts include a cooling fan, a blower motor, a positive temperature coefficient (PTC) heater, an SDC, etc., and other parts include a high-voltage junction box (HV J/BOX), a low-voltage junction box (LV J/BOX), a high-sped charging relay, an ICU, a battery heater relay, a low-voltage battery, etc.

Electric vehicle parts are controlled by a battery management system (BMS) or a vehicle control unit (VCU), chassis parts are controlled by an automatic temperature controller (ATC) or a motor control unit (MCU), and body parts are controlled by the ATC or an SDC.

FIG. 1 conceptually shows an output state of a power control object part according to fixed logic units of a conventional ATC and BMS.

Referring to FIG. 1, when the power control object part is controlled by two controllers, for example, the ATC 10 and the BMS 10, output of the power control object part is based on only a maximum value. That is, if a required output value of the ATC is 40% (PWM duty) on the basis of data such as a refrigerant pressure or an outdoor temperature and a required output value of the BMS is 80% on the basis of data such as a battery temperature or a coolant temperature, the required output values of the ATC and the BMS are compared with each other and the power control object part is controlled based on a maximum value of 80%.

Accordingly, such a conventional control method causes considerable energy consumption because control is performed only by the fixed logic units A and B and thus a vehicle state or various conditions (system deterioration, performance deterioration, etc.) are not reflected in control. This power energy consumption also occurs in a traffic congested section and torque or revolutions per minute (RPM) control.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and system for controlling high voltage power of an electric vehicle, which can control loads of an electric vehicle according to a stable/unstable state of power by monitoring a power state of the electric vehicle to efficiently use and manage energy.

Furthermore, various aspects of the present invention are directed to providing a method and system for controlling high voltage power of an electric vehicle using a high-level controller configured for securing flexibility for requirements such as various technical changes for energy efficiency improvement, and facilitating logic change when a power control object part is controlled and controlling an output value in a various manner.

It will be appreciated by persons skilled in the art that the objects that could be achieved with the present invention are not limited to what has been particularly described hereinabove and the above and other objects that the present invention could achieve will be more clearly understood from the following detailed description.

In accordance with an aspect of the present invention, the above and other objects can be accomplished by the provision of a method for controlling high voltage power of an electric vehicle, including a power state monitoring step in which a high-level controller detects power variations in a plurality of power control object parts through low-level controllers electrically connected to the power control object parts, a power state determination step in which the high-level controller is configured to determine a stable power supply state and an unstable power supply state for the power control object parts according to a power reference value preset through the power state monitoring step, and a load output control step in which the high-level controller controls all load outputs for the power control object parts according to the stable power supply state and the unstable power supply state.

In accordance with another aspect of the present invention, there is provided a system for controlling high voltage power of an electric vehicle, including a low-level controller electrically connected to each of a plurality of power control object parts provided in the electric vehicle and configured to transfer a received control command to each of the power control object parts, and a high-level controller electrically connected to the low-level controller to receive information about each of the power control object parts and configured to generate a control command for each of the power control object parts on the basis of the received information and to transmit the control command to the low-level controller, wherein the high-level controller controls all load outputs of the power control object parts according to a stable power supply state and an unstable power supply state for the power control object parts.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7 is a diagram illustrating comparison between output control values for zones according to a conventional system and the present invention.

Figure 1:
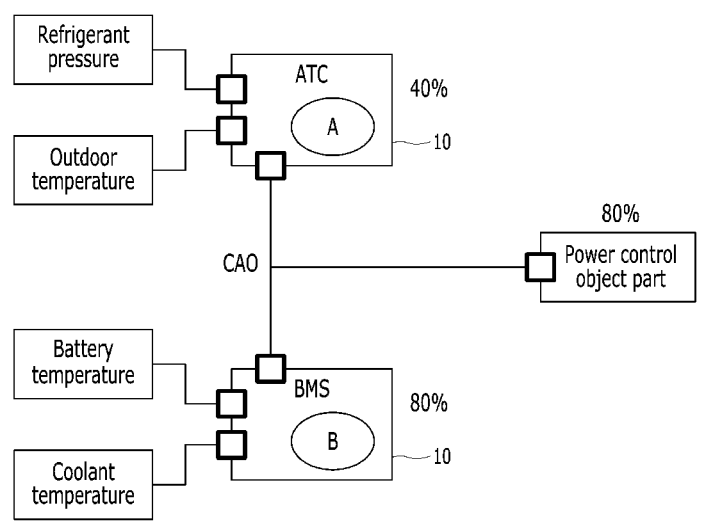
FIG. 1 is a conceptual diagram showing an output state of a power control object part according to fixed logic units of a conventional ATC and BMS.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
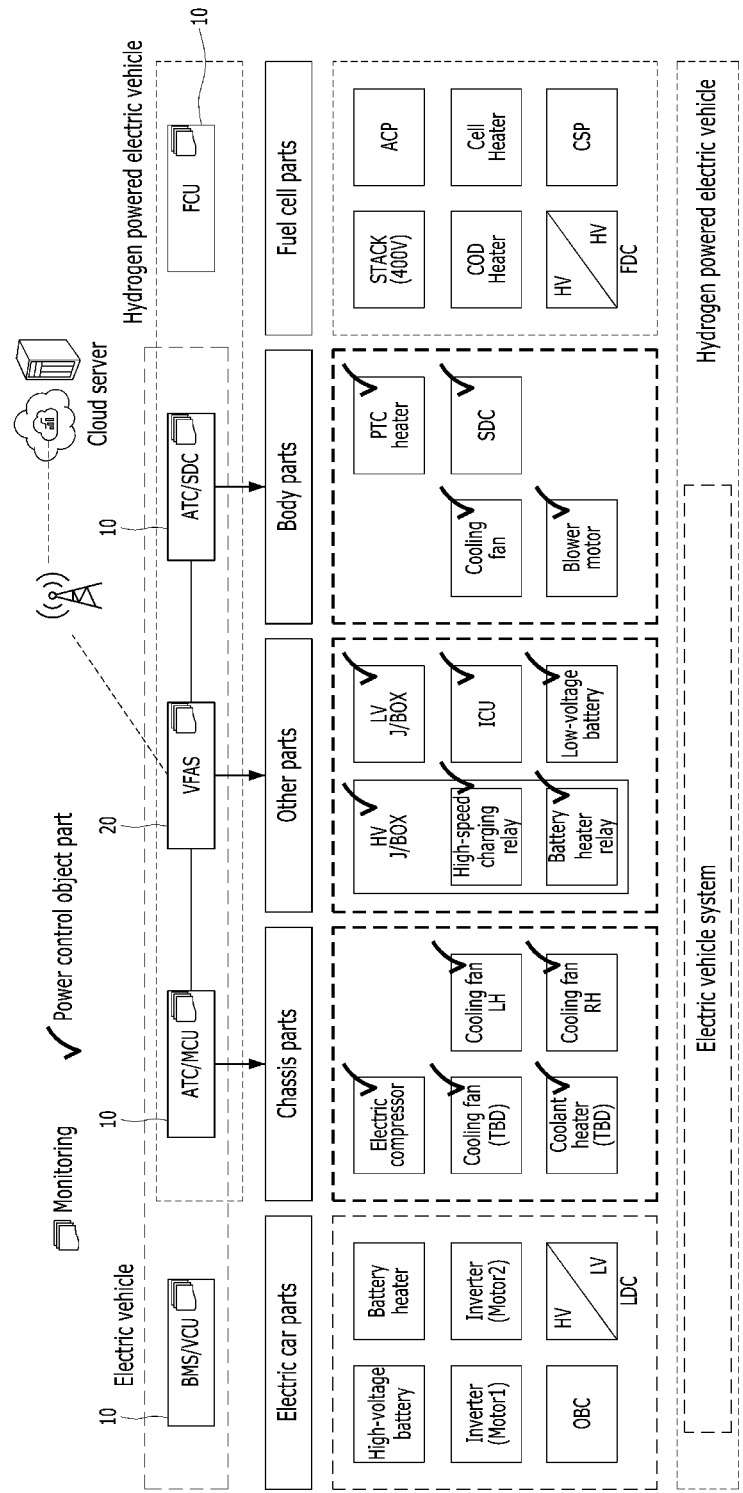
FIG. 2 is a conceptual diagram showing monitoring states with respect to low-level controllers and power control object parts in a high-level controller according to an exemplary embodiment of a system for controlling high voltage power of an electric vehicle of the present invention.

FIG. 2 is a conceptual diagram showing monitoring states with respect to low-level controllers 10 and power control object parts in a high-level controller 20 according to an exemplary embodiment of a system for controlling high voltage power of an electric vehicle of the present invention.

The system for controlling high voltage power of an electric vehicle of the present invention will be described below with reference to FIG. 2.

The system for controlling high voltage power of the present invention includes the high-level controller 20 connected to at least two low-level controllers 10.

The low-level controllers 10 are basically electrical parts that are connected to electrical parts, that is, power control object parts, used in an electric vehicle or a hydrogen powered electric vehicle (hereinafter commonly referred to as an "electric vehicle") and control the power control object parts. The low-level controllers 10 may be provided in power control object parts or may be provided separately from the vehicle and connected to the power control object parts through (CAN) communication. Referring to FIG. 2, various electrical parts such as electric vehicle parts, chassis parts, body parts, and other parts (including fuel cell parts in the case of a hydrogen controlled electric vehicle) are used in the electric vehicles. The electric vehicle parts include a high-voltage battery, a battery heater, an inverter, an on-board charger (OBC), a low-voltage DC converter (LDC), etc., the chassis parts include an electric compressor, a cooling fan (TBD, LH, RH), a coolant heater (TBD), etc., the body parts include a cooling fan, a blower motor, a positive temperature coefficient (PTC) heater, a solar DC-DC converter (SDC), etc., and other parts include a high-voltage junction box (HV J/BOX), a low-voltage junction box (LV J/BOX), a high-speed charge relay, an integrated central control unit (ICU), a battery heater relay, a low-voltage battery, etc.

The low-level controllers 10 are connected to a plurality of power control object parts provided in the electric vehicle and transfer a control command received from the high-level controller to the power control object parts to control the power control object parts. That is, a battery management system (BMS), a vehicle control unit (VCU), an automatic temperature controller (ATC), a motor control unit (MCU), an automatic temperature controller (ATC), and an SDC correspond to low-level controllers, and the aforementioned electric vehicle parts, chassis parts, body parts, and other parts are controlled only by the low-level controllers 10 in a conventional system.

In such a configuration, however, it is difficult to control the parts in various manners according to vehicle states and various types of external information or requirements, and energy consumption is high because output is controlled based on only a maximum value of required output values of the plurality of low-level controllers 10.

To solve this, the high-level controller 20 is connected to the above-described low-level controllers 10 and power control object parts are controlled through the high-level controller 20 in various exemplary embodiments of the present invention. That is, the high-level controller 20 is connected to the low-level controllers 10 and receives information about the power control object parts therefrom. Accordingly, the high-level controller 20 may check a stable power supply state and an unstable power supply state with respect to the power control object parts and control all load outputs for the power control object parts. That is, the high-level controller 20 controls the power control object parts by generating control commands for the power control object parts on the basis of information received from the low-level controllers 10 and transmitting the control commands to the low-level controller 10.

The high-level controller 20 may be connected to a cloud server (virtual private server) and may use information stored in the cloud server or transmit information to the cloud server.

Functions and features of the high-level controller 20 will be described in more details in description of a method for controlling high voltage power of an electric vehicle of the present invention.

Figure 3:
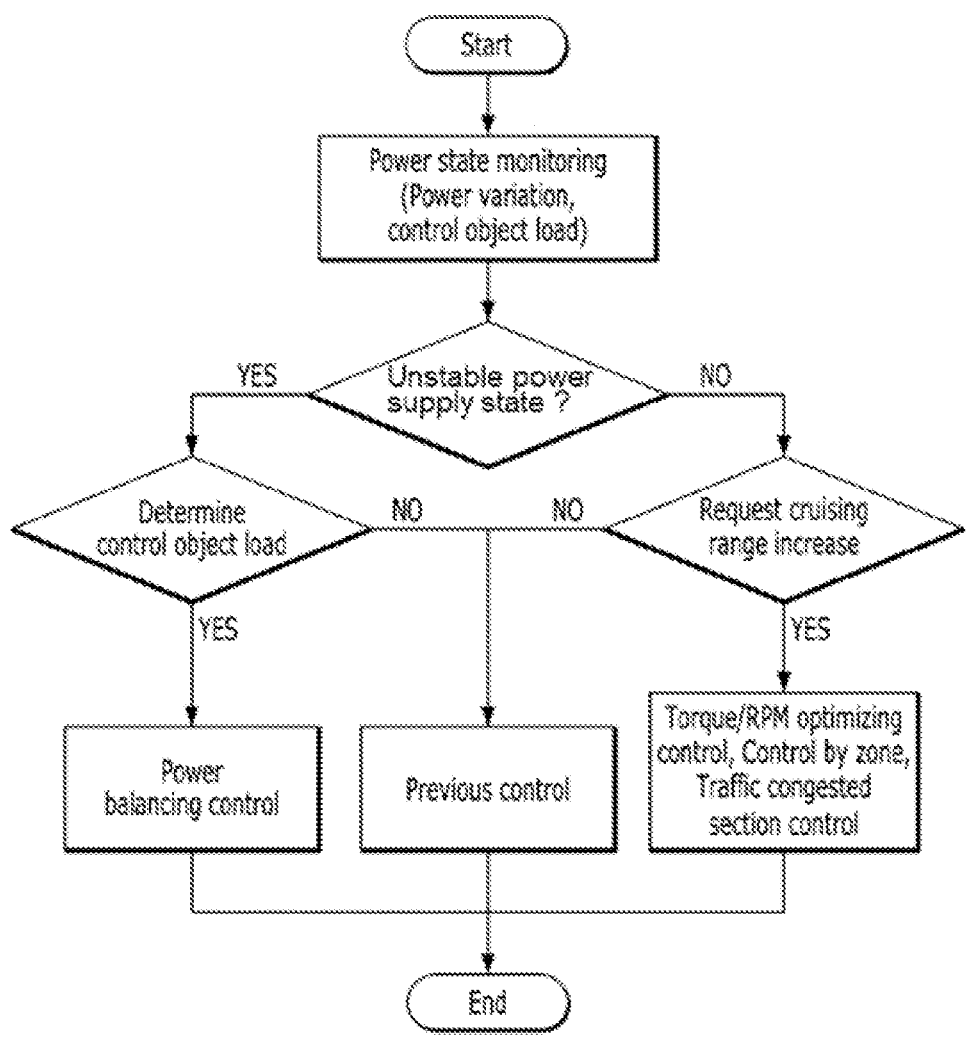
FIG. 3 is a flowchart showing an exemplary embodiment of a method for controlling high voltage power of an electric vehicle of the present invention.

FIG. 3 is a flowchart showing an exemplary embodiment of a method for controlling high voltage power control of an electric vehicle of the present invention.

The method for controlling high voltage power an electric vehicle of the present invention will be described below with reference to FIG. 3.

The method for controlling high voltage power of an electric vehicle of the present invention includes a power state monitoring step, a power state determination step, and a load output control step.

In the power state monitoring step, the high-level controller detects a total power variation or individual power variations in power control object parts through a plurality of low-level controllers.

In the power state determination step, the high-level controller is configured to determine a stable power supply state and an unstable power supply state for the power control object parts on the basis of a power reference value preset through power state monitoring.

In the load output control step, the high-level controller controls load outputs of the power control object parts according to the stable power supply state and the unstable power supply state.

First, in the case of the unstable power supply state, the high-level controller is configured to determine a power control object part having a load output to be controlled and performs a power balancing control step of controlling the load output of the determined power control object part. This will be described in more detail with reference to FIG. 4.

Figure 4:
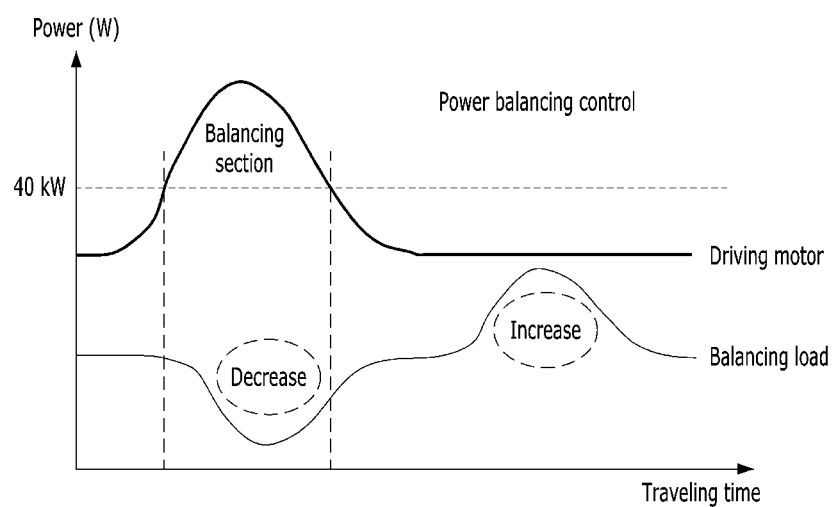
FIG. 4 is a conceptual diagram showing a power balancing control state according to various exemplary embodiments of the present invention.

FIG. 4 is a conceptual diagram showing a power balancing control state according to various exemplary embodiments of the present invention.

The aforementioned preset power reference value is assumed to be 40 kW, and the present preset power reference value may be applied as a variable value according to internal/external environmental factors of the vehicle.

Referring to FIG. 4, all load states are represented as straight lines within a range in which output is less than 40 kW irrespective of a traveling time in a normal stable power supply state, and thus a balancing load is represented as a straight line.

However, an output value of a certain power control object part, for example, a driving motor, may exceed 40 kW and thus overload is applied to the driving motor at the time of sudden acceleration or operation with maximum vehicle performance. In the instant case, the high-level controller may be configured to determine a load for power stabilization, that is, another power control object part, and reduce the output value of the determined power control object part by the output value increasing from the power reference value in the driving motor to maintain an entire power balancing state.

Furthermore, the reduced output value of the determined power control object part may be increased (compensated) in a stable power supply state to maintain a balancing load of the determined power control object part.

If the power control object part is not determined, that is, there is no power control object part having an output value to be adjusted, the high-level controller performs a control state maintenance step of maintaining a previous control state.

Next, in the stable power supply state, the high-level controller may check whether to increase a cruising range. That is, the high-level controller may be configured to determine a possible range of the electric vehicle according to remaining battery power, check whether the electric vehicle can arrive at a destination without battery charging, and determine whether to control output. Alternatively, an additional control button connected to the high-level controller may be configured and cruising range increase may be manually requested by operating the control button. When cruising range needs to be increased, the high-level controller is configured to determine a power control object part having a load output to be controlled in consideration of internal/external environments of the vehicle and performs a detailed mode control step of controlling the load output of the determined power control object part.

For example, the high-level controller may check a remaining distance to the destination and fuel efficiency through navigation information. Upon determining that remaining battery power is insufficient for the remaining distance, the high-level controller provides conditions in which the vehicle can travel to the destination using the remaining battery power by increasing the cruising range. That is, the high-level controller may reduce output power of a power control object part irrelevant to traveling through the detailed mode control step to secure battery power consumed for traveling of the vehicle.

On the other hand, upon determining that traveling to the destination is possible using the remaining battery power when the cruising range is not increased, the high-level controller performs the control state maintenance step of maintaining a previous control state.

The detailed mode control step may include a control-by-zone step, a traffic congested section control step, and a torque/revolutions per minute (RPM) optimizing control step.

The control-by-zone step is a step in which the high-level controller controls output of a load with a control value preset according to a predetermined zone.

The traffic congested section control step is a step in which the high-level controller is configured to monitor traffic congested sections and controls output of a load before entering a traffic congested section.

The torque/RPM optimizing control step is a step in which the high-level controller controls a torque or an RPM according to traveling environments.

Figure 5:
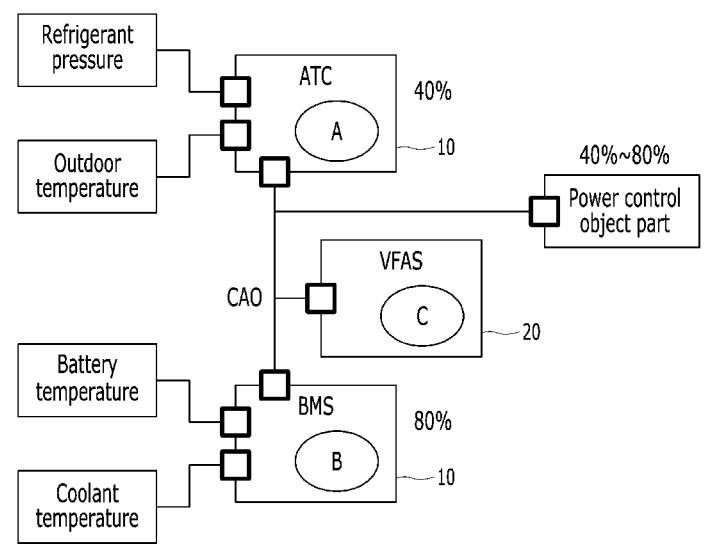
FIG. 5 is a conceptual diagram showing an output state according to control by zone according to various exemplary embodiments of the present invention in comparison with FIG. 1.
Figure 6:
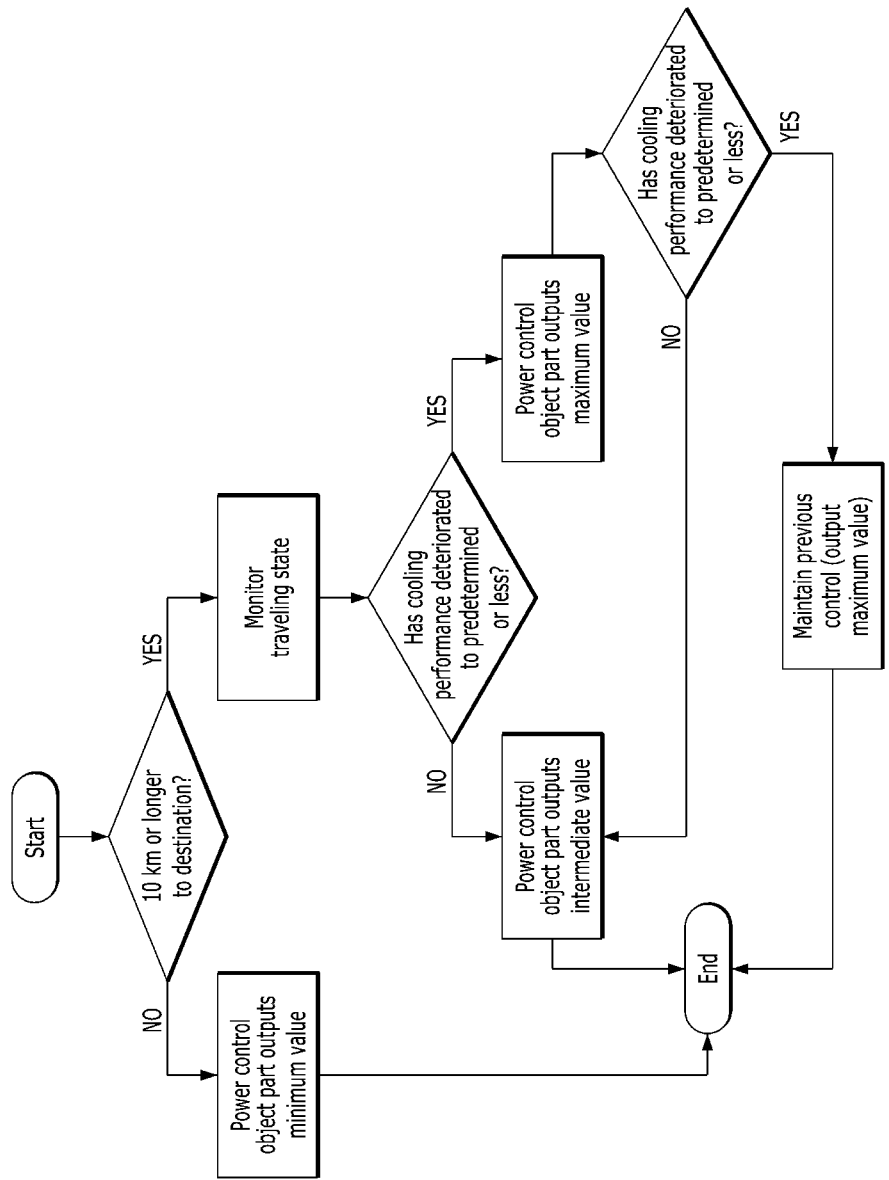
FIG. 6 is a flowchart showing an exemplary embodiment of control by zone according to various exemplary embodiments of the present invention.

FIG. 5 is a conceptual diagram showing an output state according to control by zone according to various exemplary embodiments of the present invention in comparison with FIG. 1, FIG. 6 is a flowchart showing an exemplary embodiment of control by zone according to various exemplary embodiments of the present invention, and FIG. 7 is a diagram illustrating comparison between output control values for zones according to a conventional system and the present invention.

First, the control-by-zone step according to various exemplary embodiments of the present invention will be described with reference to FIG. 5 to FIG. 7.

The control-by-zone step may include a required output value comparison step, a control value setting step, and a section control step.

In the required output value comparison step, the high-level controller is configured to receive information on required output values of a plurality of low-level controllers connected thereto and compares required output values of power control object parts. Referring to FIG. 5, a required output value of an automatic temperature controller (ATC) 10 that is a power control object part is 40%, and a required output value of a battery management system (BMS) 10 that is another power control object part is 80%.

In the control value setting step, the high-level controller 20 sets a maximum value, a minimum value, and an intermediate value between the maximum value and the minimum value among the compared required output values. Here, the intermediate value is a value less than the maximum value and exceeding the minimum value and may be variable according to vehicle control environments. Referring to FIG. 5, the high-level controller 20 may set a maximum value of 80%, a minimum value of 40%, and an intermediate value therebetween with respect to output values of the power control object parts. That is, the output values of the power control object parts are controlled through a logic unit C set in "VFAS" which is the high-level controller 20 instead of fixed logic units A and B of the ATC and the BMS that are low-level controllers 10.

In the section control step, the output values of the power control object parts are controlled through the control values (the maximum value, the minimum value, and the intermediate value) set for each of predetermined zones.

Here, the predetermined zones may include a section (zone A) in which cooling and air-conditioning performance deteriorates to a predetermined value or less, a section (zone B) in which the cooling and air-conditioning performance exceeds the predetermined value, and a section (zone C) in which a distance to a destination is within a 10 km or a time period taken for the vehicle to arrive at the destination is within 10 minutes.

Referring to FIG. 6, the high-level controller performs traveling state monitoring when a distance to a destination is 10 km or longer. Here, the high-level controller may be configured to control the output value of a power control object part to be the maximum value in the case of a section (zone A) in which cooling performance deteriorates to a predetermined value or less. Here the power control object part may correspond to an electric compressor or a cooling fan. However, the high-level controller may be configured to control the output value of the power control object part to the intermediate value upon determining that the cooling performance exceeds the predetermined value and is a satisfactory level.

On the other hand, upon determining that the distance to the destination is within 10 km, the high-level controller may be configured to control the output value of the power control object part. That is, the high-level controller performs control such that the maximum value is output in zone A, the intermediate value is output in zone B, and the minimum value is output in zone C. Here, the "predetermined value" may be stored as a value preset in consideration of internal/external environments of the vehicle.

When the output value of a power control object part is controlled to be the maximum value, the intermediate value, or the minimum value in the present manner, an energy reduction effect can be obtained as compared to the conventional system.

Referring to FIG. 7, in an example in which power control object parts correspond to an ATC and a BMS, in the conventional system, final output values of the power control object parts are 90% when a required output value of the ATC is 70% and a required output value of the BMS is 90% in zone A. Furthermore, final output values of the power control object parts are 80% when a required output value of the ATC is 40% and a required output value of the BMS is 80% in zone B. Furthermore, final output values of the power control object parts are 70% when a required output value of the ATC is 70% and a required output value of the BMS is 30% in zone C. That is, only maximum values are output in the conventional system.

However, according to various exemplary embodiments of the present invention, in the same situation as the above-described situation, 90% corresponding to a maximum value is output in zone A, 60% corresponding to an intermediate value is output in zone B, and 30% corresponding to a minimum value is output in zone C. Accordingly, the effect of energy reduction of 60% (20%+40%) as compared to that in the conventional system can be obtained.

This is represented as graphs and described below. Pulse-width modulation (PWM) duty ratios in the figures are ignored.

Figure 8A:
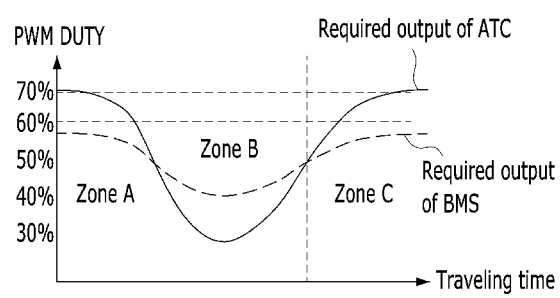
FIG. 8A is a diagram representing required output values of an ATC and a BMS as pulse-width modulation (PWM) duties.

FIG. 8A is a diagram representing required output values of an ATC and a BMS as pulse-width modulation (PWM) duties according to various exemplary embodiments of the present invention. The ATC and the BMS have different required output values for sections, that is, zone A, zone B, and zone C.

Figure 8B:
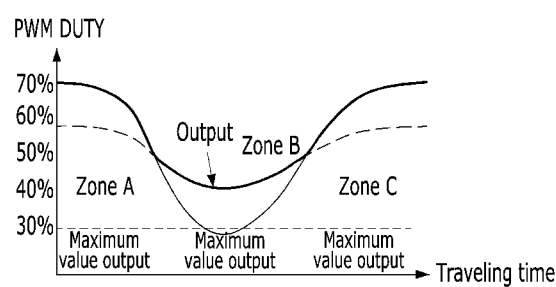
FIG. 8B is a diagram showing conventional output states for zones based on (A).

FIG. 8B is a diagram showing conventional output states for zones based on FIG. 8A. That is, only maximum values are output irrespective of zones in a conventional system.

Figure 8C:
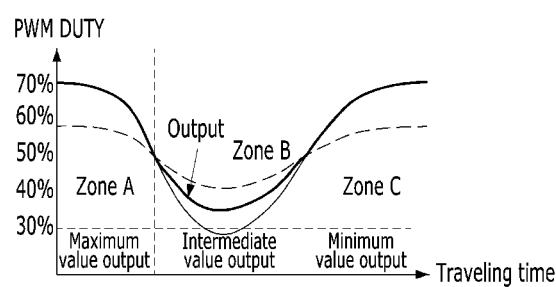
FIG. 8C is a diagram showing output states for zones according to various exemplary embodiments of the present invention based on FIG. 8A.

FIG. 8C is a diagram showing output states for zones according to various exemplary embodiments of the present invention based on FIG. 8A. That is, it can be ascertained that a maximum value is output in zone A, an intermediate value is output in zone B, and a minimum value is output in zone C according to various exemplary embodiments of the present invention.

Figure 8D:
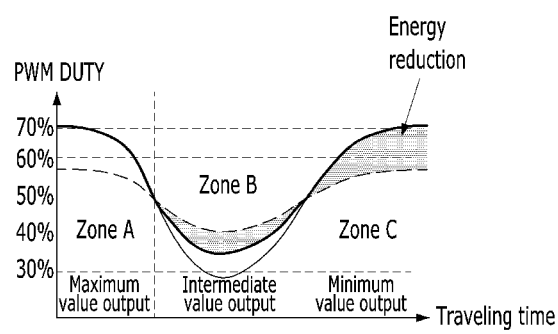
FIG. 8D is a diagram showing energy reduction according to various exemplary embodiments of the present invention as compared to a conventional system based on FIG. 8B and FIG. 8C.

FIG. 8D is a diagram showing energy reduction according to various exemplary embodiments of the present invention as compared to the conventional system based on FIG. 8B and FIG. 8C. That is, it is possible to save energy by the amount of energy reduction represented in the figure and to increase a range of the vehicle according to energy saving by optimizing control required values according to conditions for zones.

Figure 9:
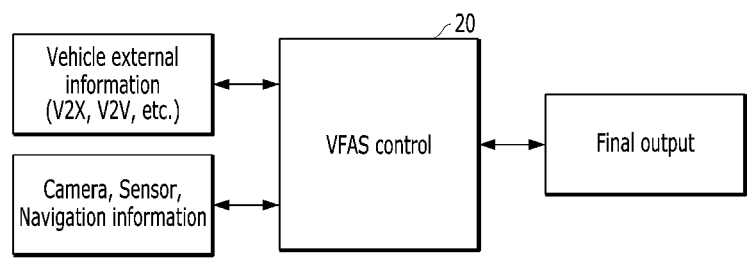
FIG. 9 is a conceptual diagram showing an operation state of a high-level controller in a traffic congested section according to various exemplary embodiments of the present invention.
Figure 10:
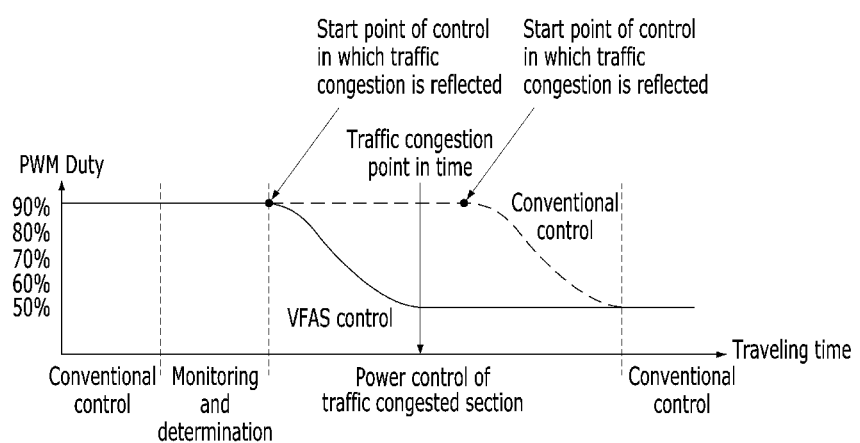
FIG. 10 is a diagram showing comparison between output value control states according to the conventional system and the present invention in a traffic congested section.

FIG. 9 is a conceptual diagram showing an operation state of the high-level controller 20 in a traffic congested section according to various exemplary embodiments of the present invention, and FIG. 10 is a diagram showing comparison between output value control states according to the conventional system and the present invention in a traffic congested section.

The traffic congested section control step in the detailed mode control step will be described below with reference to FIG. 9 and FIG. 10.

In the traffic congested section control step, the high-level controller 20 previously ascertains traffic congested sections and traffic congestion points in time on the basis of internal/external information of the vehicle and control output values of power control object parts depending thereon. To the present end, the high-level controller 20 monitors traffic congested sections using at least one of vehicle-to-everything (V2X), vehicle-to-vehicle (V2V), a camera provided in the vehicle, sensor information, and navigation information. The high-level controller 20 may previously ascertain information about traffic congested sections by use of V2X and V2V to share vehicle external information and using navigation information which is vehicle internal information, the camera, and various types of sensor information. "VFAS" in the figure represents the high-level controller.

Referring to FIG. 10, in the conventional system, an output value of a power control object part is controlled to be 90% and then gradually reduced to 50% by reflecting a traffic congestion state therein after a traffic congestion point in time (section), as represented by a dotted line.

However, according to various exemplary embodiments of the present invention, the high-level controller previously ascertains traffic congested sections through internal/external information of the vehicle and gradually reduces an output value of a power control object part by applying a traffic congestion state therein prior to arrival at a traffic congestion point in time (section), and thus energy use efficiency can be improved.

Figure 11:
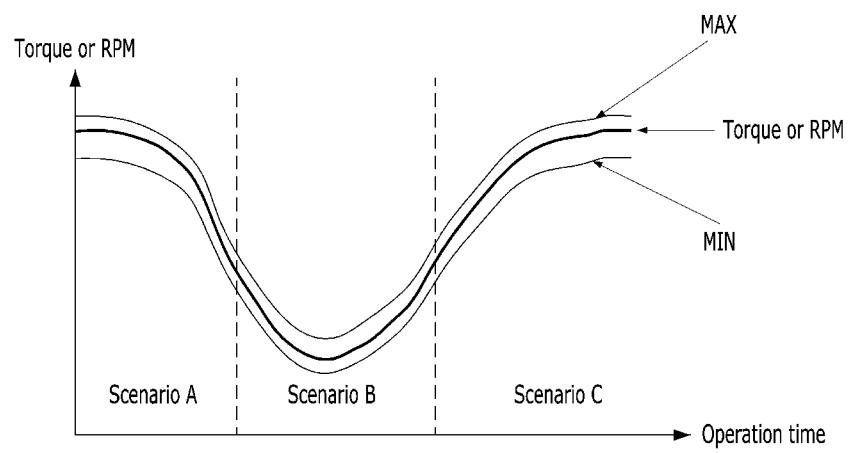
FIG. 11 is diagram illustrating torque and RPM optimizing control according to various exemplary embodiments of the present invention.

FIG. 11 is diagram illustrating torque and RPM optimizing control according to various exemplary embodiments of the present invention. The torque/RPM optimizing control step in the detailed mode control step will be described with reference to FIG. 11.

In the torque/RPM optimizing control step, the high-level controller may be configured to control a torque value or an RPM value according to scenarios A, B, and C. As a torque value or an RPM value, a maximum value MAX, an intermediate value, or a minimum value MIN may be applied to reduce battery consumption.

That is, when "scenario A" is assumed to be a downhill road, the value (intermediate value) represented by a black solid line is applied as a torque or RPM value in a normal traveling environment. However, the vehicle can travel on a downhill road even when the minimum value is applied as the torque or RPM value, and thus the high-level controller may be configured to control the torque or RPM value to be the minimum value in a "scenario A" section.

Next, when "scenario B" is assumed to be a curved road, it is difficult to output a torque or RPM value as the maximum value on a curved road. Accordingly, the high-level controller may be configured to control the torque or RPM value to be the intermediate value or the minimum value in a "scenario B" section.

Furthermore, when "scenario C" is assumed to be an uphill road, the torque or RPM value of the vehicle needs to be output as the maximum value. Accordingly, the high-level controller may be configured to control the torque or RPM value to be the maximum value in a "scenario C" section.

Road information as described above may be obtained such that road gradient information is obtained by measuring a vehicle orientation using a vehicle inertia sensor or road gradient information is acquired in advance using information of a geographic information system (GIS) and a global positioning system (GPS) mounted in a navigation system.

The method according to the above-described embodiment can be realized as a program executed in a computer, and the present program can be stored in computer-readable recording media. Examples of computer-readable media include a ROM, a RAM, a CD-ROM, a magnetic tape, a floppy disk, an optical data storage device, etc and also include a carrier-wave type implementation (e.g., transmission through the Internet).

A computer-readable recording medium is distributed to a computer system connected via a network, and computer-readable code may be saved and executed according to a distributed system. Furthermore, a function program, code, and code segments to realize the above-described method may be easily deduced by a person skilled in the art.

According to the above-described present invention, it is possible to optimize and control outputs of power control object parts of a vehicle according to internal/external environments of the vehicle through a high-level controller that can access various types of vehicle information to improve energy use efficiency as compared to the conventional system.

The present invention described above has the following advantages.

First, it is possible to detect power variation in power control object parts of a vehicle and control all load outputs on the basis of detected information for stable vehicle operation.

Furthermore, since the output of a power control object part can be controlled to be a maximum value, a minimum value, or an intermediate value therebetween for each zone, it is possible to secure output control flexibility as compared to the conventional system.

Furthermore, it is possible to improve energy use efficiency through torque and RPM optimizing control and efficient output control of power control object parts prior to entering a traffic congested section using various types of information regarding road states, which are obtained from the outside.

Moreover, it is possible to obtain the energy saving effect by optimizing output control of power control object parts of a vehicle through a high-level controller that can access various types of vehicle information.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described in order to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for controlling a voltage power of a vehicle, the method comprising:
 detecting, by a high-level controller, power variations in
  a plurality of power control object parts through low-level controllers electrically connected to the high-level controller and the power control object parts;

determining, by the high-level controller, a stable power supply state and an unstable power supply state for the power control object parts according to a preset power reference value; and controlling, by the high-level controller, all load outputs for the power control object parts according to the stable power supply state and the unstable power supply state, wherein the determining a stable power supply state or an unstable power supply state for the power control object parts includes determining at least one power control object part which is in the unstable power supply state and an exceeded amount of power of the at least one power control object part, and wherein the controlling of all load outputs includes reducing a load output of at least one of the other power control object parts by the exceeded amount of power.

2. The method of claim 1, further including:
maintaining a previous control state upon determining that the power control object part is not determined.

3. The method of claim 1, wherein the controlling all load outputs for the power control object parts includes checking whether a cruising range will be increased, determining a power control object part having a load output to be controlled in consideration of at least one of internal environment and external environment of the vehicle when the cruising range will be increased, and controlling the load output of the determined power control object part in a case of the stable power supply state.

4. The method of claim 3, further including:
maintaining a previous control state upon determining that the cruising range will not be increased.

5. The method of claim 3, further including:
controlling an output of load outputs with a control value set for each of predetermined zones;
monitoring traffic congested sections and controlling all the load outputs before the vehicle enters a traffic congested section; and
controlling a torque or revolutions per minute (RPM) of the vehicle according to traveling environments.

6. The method of claim 5, wherein the controlling an output of load outputs with a control value set for each of predetermined zones includes:
comparing required output values of low-level controllers electrically connected to the high-level controller and including the low-level controller;
setting a maximum value, a minimum value, and an intermediate value among the required output values, wherein the intermediate value is a value between the maximum value and the minimum value; and
controlling output values of the power control object parts using the control value set for each of the predetermined zones.

7. The method of claim 6, wherein the predetermined zones include a section (zone A) in which cooling and air-conditioning performance deteriorates to a predetermined value or less, a section (zone B) in which the cooling and air-conditioning performance exceeds the predetermined value, and a section (zone C) in which a distance to a destination is within a predetermined distance or a time period taken for the vehicle to arrive at the destination is within a predetermined time period.

8. The method of claim 7, wherein the high-level controller is configured to control an output value of the power control object part so that the maximum value is output in the zone A, the intermediate value is output in the zone B, and the minimum value is output in the zone C.

9. The method of claim 5, wherein, in the monitoring traffic congested sections and controlling the load outputs before the vehicle enters a traffic congested section, the high-level controller is configured to monitor the traffic congested sections through at least one of vehicle-to-everything (V2X), vehicle-to-vehicle (V2V), a camera provided in the vehicle, sensor information, and navigation information.

10. A system for controlling a voltage power of a vehicle, the system comprising:
a low-level controller electrically connected to each of a plurality of power control object parts provided in the vehicle and configured to transfer a received control command to each of the power control object parts; and
a high-level controller electrically connected to the low-level controller to receive information about each of the power control object parts and configured to generate a control command for each of the power control object parts according to the received information and to transmit the control command to the low-level controller,
wherein the high-level controller is configured to control all load outputs of the power control object parts according to a stable power supply state and an unstable power supply state for the power control object parts, and
wherein the high-level controller is further configured to determine at least one power control object part which is in the unstable power supply state and an exceeded amount of power of the at least one power control object part, and reduce a load output of at least one of the other power control object parts by the exceeded amount of power.

11. The system of claim 10, wherein the high-level controller is configured to maintain a previous control state upon determining that the power control object part is not determined.

12. The system of claim 10, wherein the high-level controller is configured to check whether a cruising range will be increased, to determine a power control object part having a load output to be controlled in consideration of at least one of internal environment and external environment of the vehicle when the cruising range will be increased, and to control the load output of the determined power control object part in a case of the stable power supply state.

13. The system of claim 12, wherein the high-level controller is configured to maintain a previous control state upon determining that the cruising range will not be increased.

14. The system of claim 12, wherein, upon controlling all load outputs for the power control object parts according to the stable power supply state and the unstable power supply state for the power control object parts, the high-level controller is configured to control load outputs with a control value set for each of predetermined zones, to monitor traffic congested sections and to control all the load outputs before the vehicle enters a traffic congested section, or to control a torque or revolutions per minute (RPM) of the vehicle according to traveling environments.

15. The system of claim 14, further including a plurality of low-level controllers having the low-level controller,
wherein, upon controlling all the load outputs with the control value set for each of the predetermined zones, the high-level controller is configured to compare required output values of the plurality of low-level controllers electrically connected to the high-level controller, to set a maximum value, a minimum value, and an intermediate value among the required output values, and to control output values of the power control object parts using the control value set for each of the predetermined zones, and wherein the intermediate value is a value between the maximum value and the minimum value.

16. The system of claim 15, wherein the predetermined zones include a section (zone A) in which cooling and air-conditioning performance deteriorates to a predetermined value or less, a section (zone B) in which the cooling and air-conditioning performance exceeds the predetermined value, and a section (zone C) in which a distance to a destination is within a predetermined distance or a time period taken for the vehicle to arrive at the destination is within a predetermined time period.

17. The system of claim 16, wherein the high-level controller is configured to control the output values of the power control object parts so that the maximum value is output in the zone A, the intermediate value is output in the zone B, and the minimum value is output in the zone C.

18. The system of claim 14, wherein, upon monitoring the traffic congested sections and controlling the load outputs before the vehicle enters the traffic congested section, the high-level controller is configured to monitor the traffic congested sections through at least one of V2X, V2V, a camera provided in the vehicle, sensor information, and navigation information.

* * * * *